June 8, 1965   J. H. WOODWORTH   3,188,607
WELL GEOPHONE
Filed Aug. 26, 1959   2 Sheets-Sheet 1

June 8, 1965   J. H. WOODWORTH   3,188,607
WELL GEOPHONE
Filed Aug. 26, 1959   2 Sheets-Sheet 2
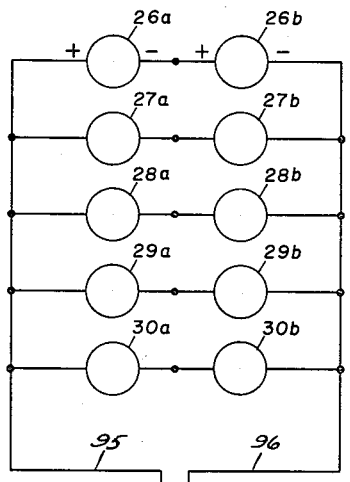
FIG. 3
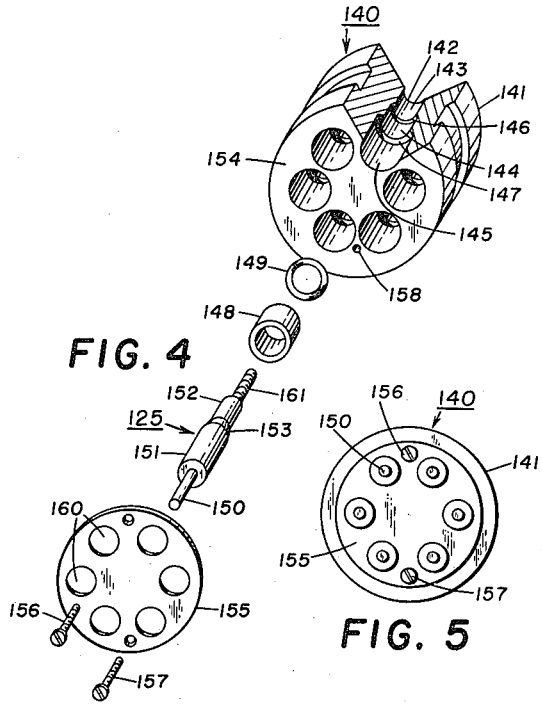
FIG. 4
FIG. 5
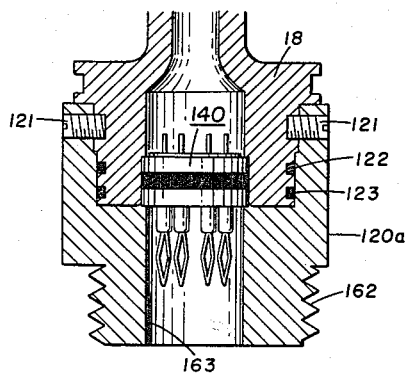
FIG. 7
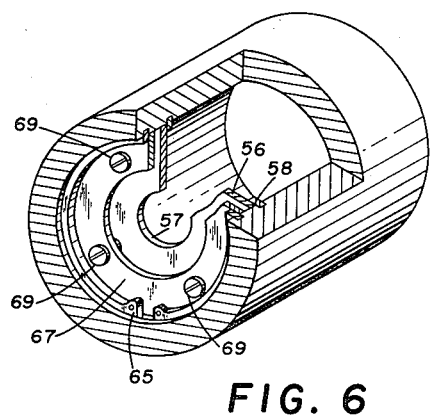
FIG. 6

3,188,607
WELL GEOPHONE
John H. Woodworth, Dallas, Tex., assignor to Socony
Mobil Oil Company, Inc., a corporation of New York
Filed Aug. 26, 1959, Ser. No. 836,171
7 Claims. (Cl. 340—17)

This invention relates to improvements in well geophones and more particularly to a new and improved well geophone for accurate velocity measurements of earth strata traversed by a wellbore and has for an object the provision of a well geophone capable of generating in response to acoustic energy an electrical signal of high signal-to-noise ratio and one that is relatively insensitive to noise generated by movement of the geophone relative to the earth formation under investigation.

In the survey of earth structures traversed by a wellbore, an acoustic detector, such as a geophone, is lowered into the wellbore to a predetermined point below the surface of the earth. At, or near, the surface of the earth an acoustic pulse is generated as by detonation of an explosive charge. The time for the acoustic pulse to travel by way of the earth structure from the point spaced from the geophone to the geophone itself is measured to obtain average velocity characteristics of the earth formation traversed by the acoustic pulse. Information as to the average velocity is useful to the geophysicists in the interpretation of seismograms taken in the area for it makes possible the establishment of the true time in seismic operations for the travel of acoustic energy from the surface to reflecting horizons within the earth.

The acquisition of such information has been complicated in the past by the high attenuation of signals traveling from a source at the earth's surface to a geophone located deep within the earth. It has also been complicated by the fact that noise is generated by movement of the tool or geophone relative to and against wall structure of the wellbore traversing the earth formation.

In accordance with one aspect of the present invention, there is provided a well geophone which is insensitive to noise generated by tool movement and one whose output has a high signal-to-noise ratio. In one embodiment the well phone is comprised of a central mandrel including a passage extending from one end toward an opposite end thereof. A plurality of transducers are supported on the mandrel and are in flow communication with the passage. These transducers, exposed to well pressures, including both static and dynamic pressures by way of a first fluid path, are arranged in pairs with the transducers of each pair oppositely disposed on the mandrel and electrically connected in series. The transducers are rendered responsive solely to dynamic well pressures by maintaining substantially equal static well pressures on both sides of the pressure sensitive element of each transducer. The pressure equalizing means, responsive to static well pressures, includes a reservoir for receiving a pressure-transmitting liquid. The balancing static well pressures are applied to the transducers by way of a second flow path including first and second flow restrictions interconnecting the reservoir and the central passage of the mandrel.

Since an explosive charge is usually the means of generating the acoustic pulse, each measurement of average velocity requires the detonation of a separate charge. In order to receive a signal at the lower depths, it has been customary to increase the size of the explosive charge. The cost of taking the measurement increases with the size and number of charges. In accordance with the present invention, the high sensitivity of the geophone makes it possible to use a dynamite charge of substantially smaller size than heretofore employed; and in accordance with another aspect of the present invention, it is possible to obtain more than one measurement of average velocity and establish a plurality of tie points in response to a single detonation. The plural measurement is accomplished by interconnecting two or more geophones at fixed, spaced-apart points. More particularly, there is provided a well geophone capable, despite extremely high static pressures encountered in wells, of interconnection with a second geophone spaced therefrom by an interconnecting cable. A high pressure seal for liquids is mounted at one end of the mandrel passage and has a plurality of conducting means passing therethrough for electrical connection to the cable interconnecting the two geophones.

For further objects and attendant advantages of the present invention, reference will now be had to the following detailed description taken in conjunction with the accompanying drawings in which:

FIG. 1 schematically illustrates a geophone embodying the present invention located within a wellbore with additional geophones illustrated in phantom;

FIG. 3 is a circuit schematic illustrating the electrical connection of the plurality of transducers included within the geophone;

FIG. 4 is an exploded, enlarged view of a high pressure seal embodying an aspect of the present invention;

FIG. 5 is an end view of the body of the seal of FIG. 4;

FIG. 6 is a perspective view of a damping means embodying another aspect of the present invention; and FIG. 7 is a modification of the end portion of the well geophone for connection to a second geophone spaced therefrom within a wellbore.

Figures 1, 2A, 2B:
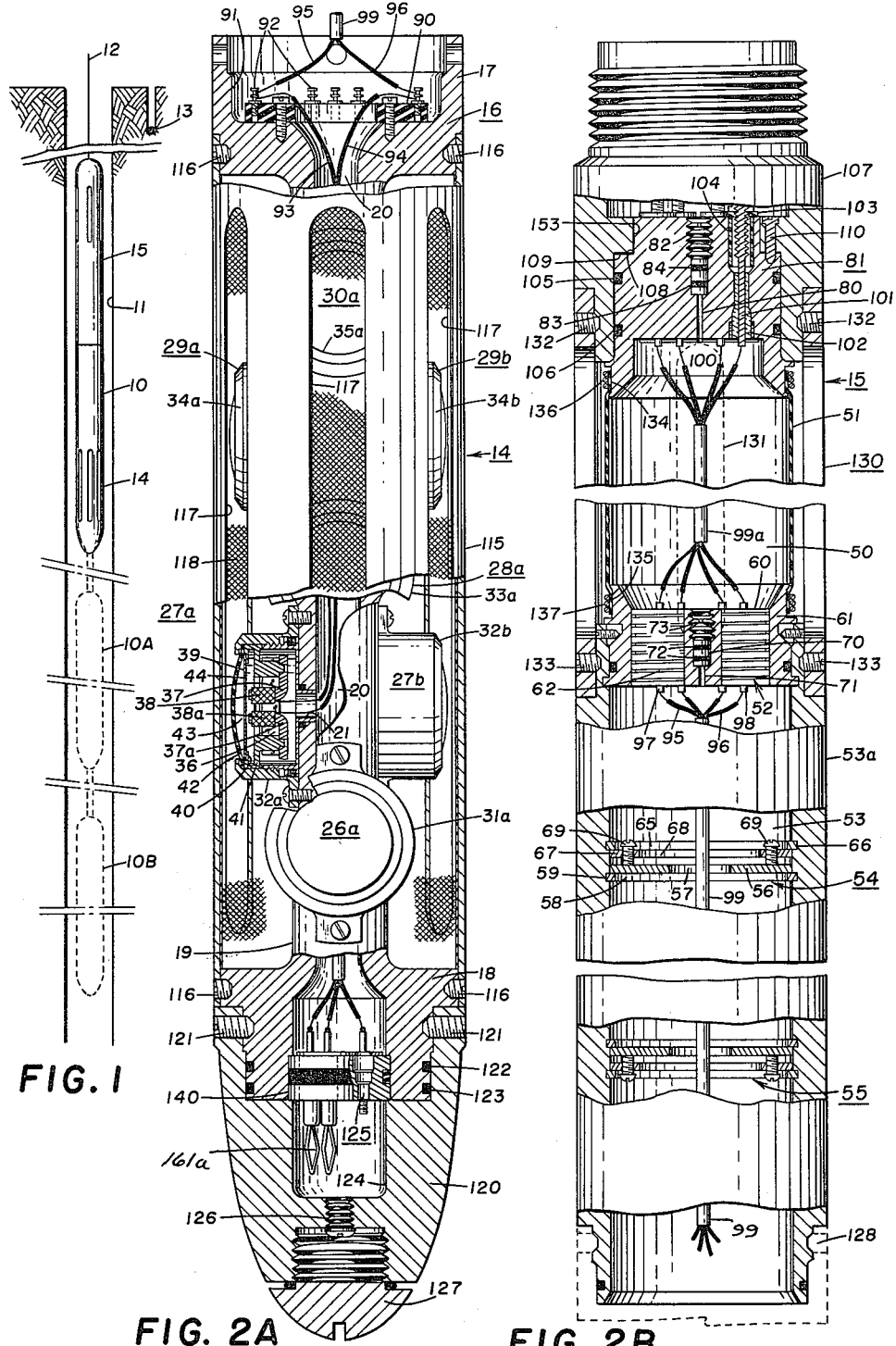
FIGS. 2A and 2B are enlarged cross sections of a well geophone embodying the present invention.

Referring now to FIG. 1, there is illustrated a well geophone 10 embodying the present invention supported within a liquid-filled wellbore 11 by way of a cable 12. In response to acoustic energy generated by way of a suitable source, for example, a charge of dynamite 13, near the earth's surface and traveling by way of the earth formation to a receiving portion 14 of the well geophone, an electrical signal is generated and transmitted back to the earth's surface to suitable recording equipment (not shown) as by way of the cable 12.

The time interval elapsing between the generation of the pulse of acoustic energy and the receipt thereof at the geophone, which is at a known distance from the source of energy, is a measure of the average velocity of the earth's substructure traversed by the acoustic energy. The information thus derived is extremely useful to geophysicists in their interpretation of seismograms taken in the area. Usually the measure of average velocity is taken over various distances or at different depths within the wellbore. Thus, for each measurement it is necessary to generate another pulse of acoustic energy as by detonating another charge of dynamite. It is evident that in order to carry out an economical well survey, it is of importance that a useable signal be derived each time the acoustic pulse is generated and for this reason that the detecting instrument be extremely sensitive to the arrival of acoustic energy at some point within the depth of the wellbore. It is also important from the economical standpoint that the amount of dynamite utilized and the number of shot holes drilled and their depth be held to a minimum. Despite the availability of sensitive geophones, other factors enter into the detection to confuse and otherwise make unuseable the signals so derived. For example, as the geophone or well survey tool 10 is lowered into the well, it invariably will contact the wall structure of the wellbore, giving rise to high background noise signals. The contact with the wall structure of the wellbore continues during the measuring operation to modify and even obscure the signal which it is hoped to be detected and utilized. In addition, the static pressures within the well and surrounding the tool vary as the position of the tool is changed within the wellbore. Inasmuch as the geophone or well survey tool 10 is pressure sensitive, the sensitivity of the geophone will be reduced and the output signal therefrom will be affected in a manner to make unreliable and often undetectable its signals.

In one aspect of the present invention, there is provided a well survey tool which is made highly sensitive to dynamic signals being transmitted from the source of acoustic energy and one that is substantially insensitive to noise signals produced as by contact of the tool with the wall structure of the wellbore. More particularly, in one embodiment of the present invention, there are provided a plurality of detecting elements embodied in pairs with detectors of each pair connected for noise cancellation and with the detectors of all pairs connected in signal aiding relation.

The insensitivity and unreliability induced by the changes in static pressure are obviated by providing a pressure equalizing source located within an upper portion 15 of the well geophone 10. The source is effective to equalize the static pressures within the receiving portion 14 of the geophone with the static pressures existing in the surrounding environment of the wellbore. More particularly, the pressure equalizing source includes a reservoir of a compressible pressure-transmitting liquid and is effective in maintaining equal the static pressures otherwise affecting the detector sensitivity and in a manner now to be described.

The receiving portion 14, FIG. 2A, of the well geophone 10 includes a central mandrel 16 having enlarged end portions 17 and 18 and a reduced center portion 19. A passage 20 for liquid flow extends from one end 17 of the mandrel toward the opposite end 18 of the mandrel. Preferably, the passage 20 extends entirely through the body of the mandrel 16 as shown and also serves as a channel or conduit for electrical conductors associated with the various detectors of the illustrated tool and with the detectors of other tools which may be mechanically and electrically connected therewith and in a manner hereinafter described. The passage 20 is connected with radial flow passages; only one of which, the radial flow passage 21, has been illustrated. In the illustrated embodiment there are ten such radial flow passages but only one is illustrated in the interest of reducing the complexity of the drawings. It will be understood, however, that each radial flow passage is associated with a transducer and that the arrangement in all cases is as represented by the passage 21 and the transducer housing 32a.

The mandrel 16 provides a supporting structure for a plurality of detectors or transducers 26a, 26b–30a, 30b respectively contained within housings 31a, 31b–35a, 35b. Transducers 26b, 28b, and 30b and their respective housings 31b, 33b, and 35b are not illustrated in FIG. 2A but it is understood that they are located on the opposite side of the mandrel 16. Inasmuch as the transducers and housings in the preferred embodiment are all identical, the description and specific illustration of one will be adequate to instruct those skilled in the art in the practice of the present invention. Accordingly, in the description which follows, only one of the transducers and housings will be specifically described with the understanding that such description applies to all the transducers, but with the further understanding that it is optional with one practicing the invention as whether to use identical transducers and also with respect to the number of transducers to be employed.

The transducer 27a is an electromagnetic transducer of the pressure sensitive type similar to those employed in the telephony art. It comprises a pair of permanent magnets only one of which, the magnet 36, is illustrated. The transducer 27a includes pole pieces 37 and 37a about which are wound respectively coils 38 and 38a. A metallic diaphragm 39 is mounted on a flange 40 of the transducer's main structure 41 and is responsive to dynamic changes in pressure to vary the air gap between it and the pole pieces 37 and 37a to generate an electrical signal representative of the character of the dynamic pressure pulse.

It will be evident that the outer surface of the diaphragm 39 has applied thereto the static pressure of the liquid contained within the wellbore. If uncompensated for, the static pressure will affect the operational characteristics of the transducer adversely. The static pressure is compensated for by applying to an opposite side of the diaphragm a balancing pressure which is the liquid pressure in the wellbore. The equalization of pressure is accomplished by means including a static-pressure sensitive arrangement contained within the pressure-equalizing element 15, FIG. 2B, of the tool 10. The pressure-equalizing means includes a housing 50 having walls 51 provided by a flexible tube formed of neoprene or similar flexible material. The housing 50 contains a pressure-transmitting liquid which is coupled by way of the walls 51 to the liquid pressure in the wellbore. Any changes in static pressure in the wellbore are transmitted by way of a capillary structure 52, channel 53 and damping means 54 and 55 to the flow passage of the mandrel and thence to the transducer-housing cavity adjacent the inner surface of the diaphragm 39 (FIG. 2A).

The static-pressure equalizing means provides for static pressure equalization while blocking the transmission of dynamic pressure changes to the back or innersurface of the transducer. This function is provided by the capillary means 52 comprised of a metallic capillary plug 60 frictionally fitted within a plug mounting 61. The cylinder 60 is provided with a helical groove 62 formed in the periphery thereof. The groove 62 cooperates with the innersurface of the mounting 61 to provide an elongated, tortuous liquid path between the cavity or housing 50 and the channel 53. The capillary means offers a high impedance to the transmission of high frequency pressure changes between the housing 50 and the passage 53 while offering negligible impedance to pressure changes of low frequency. Thus the capillary arrangement 52 is effective to transmit slow changes in pressure such as occur while lowering the tool and which have been referred to heretofore as static pressure, while offering a very high resistance to transmission of high frequency pressure changes such as dynamic changes in pressure produced in response to the arrival of acoustic energy from the surface source. In one embodiment of the present invention, the plug was formed of Naval Bronze—full hard and had the following dimensions: 1.9 inches in diameter, 1 inch in length, with a 60° helical V groove of a depth of 0.010 inch and with ten grooves per inch. With such construction, it is possible to obtain a very high fluid flow impedance while using a short portion of the over-all length of the well survey tool.

In order to maintain maximum transducer sensitivity, it is necessary to employ a large quantity or volume of compressible pressure-transmitting liquid. While the liquid is to only a limited degree compressible, with enough liquid present, it is possible to provide for a substantially undamped deflection of the transducer diaphragm in response to dynamic pressure changes. The housing of an adequate supply of liquid necessitates a structure of fairly large size resonant at a frequency of the dynamic-pressure change. This frequency referred to earlier is in the order of 150–200 cycles per second and, relative to static pressures, is considered to be high frequency.

It has been found that the vibration of transducer diaphragms in response to acoustic pulses is transmitted through the pressure-transmitting liquid into the passage 53 and that the column of liquid in the chamber begins to resonate. Resonance of the liquid column is also generated by contact of the tool with wall structure of the borehole and by the generation of other high level noise such, for example, as gases bubbling in the wellbore. The ringing or resonance caused by the latter conditions is of adequate amplitude to substantially obscure the signal generated by the transducers in response to the arrival of the acoustic energy from the surface source. Accurate well surveys thus are made difficult to attain.

The ringing caused by the former condition extends over periods of up to 3 to 4 milliseconds. Time periods of this duration are sufficiently long to obscure the arrival of energy from reflecting formations where the well logging tool is employed for such purpose. In all instances the capillary means 53 is ineffective to damp out the ringing or resonance because of its characteristic of offering a high impedance to fluid flow at the high resonance frequencies. Its operation may be likened to that of a choke in electrical circuits.

In accordance with one aspect of the present invention, the resonance or ringing is attenuated or damped by providing at least one damping arrangement 54 within the passage or chamber 53. The damping arrangement 54 comprises a ring 56, having a central aperture 57 whose diameter or cross section is small compared with the cross section of the passage 53. With the passage having an internal diameter of 2.5 inches, a diameter of 1 inch for the aperture 57 was found suitable. Aperture diameters of less than one inch will also be satisfactory.

The damping ring 56 is mechanically mounted at the inside of passage 53 by way of structure including a resilient split ring 58 which is expanded into a groove 59 formed in the inner-wall of the housing for passage 53. A second resilient split ring 65 is likewise mounted in a groove 66. A second ring or washer 67 having an opening 68 larger than the aperture 57 is placed with the damping ring 56 between the split rings 58 and 65. The relationship of the parts and their actual construction are more clearly shown in the prespective view, FIG. 6. The ring 67 is provided with a number of tapped holes threadedly receiving machine screws 69 whose ends bear against the attenuating or damping ring 56 to force the rings apart and into tight mechanical contact with the split rings 58 and 65, thus forming a unitary structure.

Thus as described, there is provided an arrangement for equalizing static pressure on opposite sides of the transducer diaphragm while limiting the application of dynamic energies or changes in pressure to one side of the transducer diaphragm and while also attenuating spurious oscillations or resonances within the tool, all to maintain high sensitivity and reliable performance.

In one embodiment of the invention now in use having a long passage or chamber 53 it has been found desirable to employ more than one attenuating or damping arrangement, for example, a second damping arrangement 55. It is spaced from the first damping means 54 and may be mounted in similar manner in the chamber or passage 53. Additional damping means may be added along the length of the passage 53, dependent upon the length of the passage, in all cases to provide means for attenuating ringing or resonance which otherwise interferes with the characteristics of the signals generated by the transducers and obscures the information sought.

The diaphragm 39 of each transducer has its outer surface shielded from wellbore fluids by a cover 42. While a common sheath covering all of the transducers would be effective to shield the diaphragms from the corrosive action of the well fluids and from the accumulation of minute metallic particles often present in the well, the high frequency response of the transducers is enhanced by providing the separate covers.

Each cover 42 is dome-like in configuration and is formed of an electrically non-conductive fluid-impervious material such, for example, as neoprene. The dome 42 is mounted adjacent the diaphragm 39 with the edges of the cover secured between opposing flanges of the housing structure of the transducer.

A high degree of acoustic coupling is provided between the diaphragm and wellbore fluids by filling the space 43 between the cover 42 and the diaphragm 39 with pressure-transmitting liquid which may be the same type as that employed in the pressure equalizing system of the well survey tool. This pressure-transmitting liquid preferably is a silicon-base oil of the Dow Corning type D–C 200 having a low viscosity; for example, one centistoke.

The well survey tool is filled with the pressure-transmitting liquid initially by unscrewing liquid-tight plug 70 provided with liquid seals including one or more O-rings 72. The plug 70 provides a closure in a passage 71 traversing the length of the capillary means 52. The liquid then is poured into the chamber 53. The liquid flows into the transducers by way of their respective radial passageways. The chamber or passage 53 and all interconnected cavities are partially evacuated as by use of a vacuum pump which may be attached as by way of the screw thread 73.

Each diaphragm is provided with a minute aperture 44 interconnecting the cavities on either side of the diaphragm. The reduced internal pressure causes the cover 42 for diaphragm 39 to collapse against the diaphragm. The vacuum is released. Upon resultant outward movement of cover 42 the liquid is sucked into the chamber or space 43 from chamber 53 by way of the minute aperture 44. With the chamber 53 and all other spaces therebelow filled with liquid, the plug 70 is once again secured and liquid or oil is now added into the pressure responsive chamber 50 by way of passage 80 formed in end closure 81. When the chamber has been filled, the plug 82 is screwed in position to close off the chamber 50. Like plug 70, the plug 82 has formed on the lower end thereof cylindrical portions provided with grooves for receiving O-rings 83 and 84 providing liquid-tight seals in conjunction with adjacent surfaces of the passage 80.

As thus far described, there is provided an instrument extremely sensitive to dynamic signals generated downhole and one substantially free of interferences from resonances created within the liquid passage of the instrument. However, in order to obtain useful signals it is necessary to have an instrument that is not only sensitive but selectively sensitive. In other words, the instrument which responds with extreme sensitivity to dynamic signals produced in response to acoustic energy traveling from the surface source should also be relatively insensitive to noise generated by movement of the tool itself. This desirable feature of a well survey instrument is provided in accordance with the present invention by mounting a plurality of transducers within the receiving section 14 and connecting them in such manner as to provide for a cancellation of noise signals.

More particularly, the transducers 26a, 26b–30a, 30b are connected electrically in the manner illustrated in FIG. 3. It will be observed that the transducers of each oppositely mounted pair are connected in series aiding relation and that the pairs of transducers are connected in parallel. The series connection of the transducers functions to cancel any noise signals generated by movement of the tool. For example, if the tool moves in one direction, the diaphragm of one transducer may move inwardly while the diaphragm of the opposite transducer will move outwardly. The resulting electrical signals are 180° out of phase. When added by the series connection these out of phase signals cancel. Acoustic energy signals on the other hand will arrive simultaneously at all sides of the well survey tool thus causing all the diaphragms to move in or to move out in accordance with the polarity of the energy. The signals generated by the transducers will be added in each branch of the network of FIG. 3 and the resultant currents formed therein are added by the parallel connection of the branches to give rise to an increased electrical signal for recording uphole.

Each of the conductors associated with the transducers 26a, 26b–30a, 30b extends along the central channel of the mandrel 16 and terminate at a terminal ring arrangement 90 positioned within a recess 91 in the upper end 17 of the mandrel. Only two of the conductors have been illustrated. The terminal ring 90 is provided with a plurality of terminals 92 to which the various conductors as represented by the conductors 93 and 94 associated with the transducer 27a are connected. There at the terminal ring various connections and interconnections are made to provide the network illustrated in FIG. 3. The output of the network FIG. 3 is applied to conductors 95 and 96 extending upwardly through the passage 53 to feed-through terminals 97 and 98 mounted in the capillary structure 52.

It is to be noted here that the conductors 95 and 96 are shown forming part of a cable 99 which is a multiple conductor cable containing as many as six conductors. Each pair of conductors in the cable will be associated with a different network located in additional well survey tools which may be electrically and mechanically connected in a string for recording a plurality of well survey points at one operation. A second portion 99a of the cable 99 extends from an opposite end of the feed-through terminals 97, 98 to additional feed-through terminals 100 mounted in the end closure assembly 81. The opposite ends of the feed-through terminals 100 are provided with connectors which may be of the bayonet or screw type (not shown) for connection to a suitable well logging cable.

The end closure 81 includes provisions for six feed-through terminals 100, one of which is shown in cross section to include a metallic center portion 101 having the lower end mechanically bonded to a sleeve 102 of ceramic or like insulating material and with the opposite end thereof provided with threads for receiving an end cap 103. A sleeve 104 of insulating material insulates the upper portion of the feed-through pin from the wall structure of the end closure assembly 81. In keeping with the object of maintaining fluid type connections, the end closure is provided with O-rings 105 and 106 which contact the inner surface of the recess within a coupling member 107. The end closure 81 is secured to the coupling member 107 by way of machine screws represented by machine screw 110 which seats mating flanges 108 and 109, respectively, of end closure 81 and member 107.

The lower portion 14 of the tool, FIG. 2A, is provided with a cover 115 secured at opposite ends to the enlarged end portions 17 and 18 of the central mandrel as by way of set screws 116. The cover 115 includes a plurality of elongated slots 117 to provide entry of well bore fluids and the contact thereof with the transducers. The well bore liquids provide coupling between the transducers of the well survey instrument and the earth formations for transmission of acoustic energy therebetween. A fine mesh screen 118 is welded or otherwise secured to the inner-surface of cover 115 to protect the transducers from physical damage while maintaining a low impedance to the transmission of pressure changes to the transducer elements. While the well survey instrument 10 has been described as being comprised of two parts, it is to be understood that the instrument may be divided into as many parts as convenient. In general the instrument will be constructed of high tensile corrosion resistant materials, preferably chrome steels or stainless steels.

In the embodiment shown the instrument is provided with a nose plug 120 secured to a reduced portion of end 18 by way of set screws 121. O-rings 122 and 123 maintain the fluid-tight integrity of the instrument. As shown, the nose plug 120 is of the type to be employed where only one well survey instrument is to be employed. The nose plug 120 includes a cavity 124 for receiving terminals or contacts 125 of a feed-through assembly which is hereinafter described in detail and which is intended to be used in an arrangement involving more than one well survey instrument.

In assembling the nose plug 120 on the tool, machine screw 126 and end cap screw 127 initially are removed in order to avoid compression of air in cavity 124. After the end cap has been secured in place, the screws 126 and 127 are replaced in that order.

The upper unit 15, FIG. 2B, secured to the lower unit 14 by set screws 128 includes supporting structure 130 for the chamber 50. The structure 130 includes a plurality of slots 131, one of which is shown in phantom, to provide for well fluid coupling with the chamber 50. One end of supporting structure 130 is secured to coupling member 107 by way of set screws 132. The lower end of structure 130 is similarly secured to the housing 53a as by way of set screws 133.

The end closure 81, connected with coupling member 107, includes a depending flange 134 for receiving one end of the neoprene tube forming the housing 50. Similarly, the plug mounting structure 61 has an upwardly extending flange 135 to which an opposite end of the tube is secured. In both instances, the tube may be secured at the supporting flanges as by way of wires 136 and 137 wrapped circumferentially about the ends of the tube and about the flanges.

In accordance with another aspect of the present invention, there is provided a feed-through terminal assembly 140 capable of withstanding extremely high pressure differentials and making possible the aforementioned multiple connection of well survey tools. A plurality of well survey instruments 10A and 10B, FIG. 1, may be mechanically and electrically interconnected for simultaneously recording formation velocity characteristics at different points in the well bore in response to a single acoustic pulse generated at the earth's surface. Thus, there is immediately a considerable saving in number of shot holes that need be drilled for taking a well survey and with the increased sensitivity of each well survey instrument the single charge employed for each measurement need be but a fraction in size as compared with the size of charges heretofore employed.

Details of the high pressure feed-through terminal assembly are illustrated in FIGS. 4 and 5. The assembly 140 is comprised of a body section 141 formed of stainless steel or similar high-tensile metal and being cylindrical in configuration. A plurality of passages, represented by the passage 142, extend completely through the longitudinal dimension of the body. Each of the passages receives a feed-through terminal as represented by terminal 125. Since each of the passageways is identical, the description of one will be adequate for a complete understanding of the others. The passage 142 consists of an initial bore 143, a first counterbore 144 and a second counterbore 145. The bores 143–145 provide shoulders 146 and 147 for supporting other elements of the assembly including the terminal 125, sleeve 148 and O-ring 149. The terminal 125 includes a metallic conductor 150 about which is secured a ceramic sleeve 151 having a reduced section 152 providing a shoulder 153. With the feed-through terminal 125 in position within the passage 142, the shoulder 153 abuts with the shoulder 146. The O-ring 149 is mounted over the sleeve 151 and the metal sleeve 148 is mounted within the counterbore 145 coaxially with the terminal 125 and abutting with the O-ring 149. The over-all longitudinal dimension of the assembled sleeve 148 and the O-ring 149 exceeds the longitudinal dimension of the counterbore 145 such that the sleeve 148 extends a slight distance beyond the face 154 of the body portion 141. The sleeve 148 is moved inwardly of the counterbore 145 to compress the O-ring 149 by a cover plate 155. The plate is mounted over the face 154 of the body 141 by way of machine screws 156 and 157 and tapped holes 158, one of which is shown.

The compressed O-ring 149 provides a fluid-tight seal within the passage 142. The apertures or holes 160 in the cover plate 155 have an inside diameter smaller than the outside diameter of the sleeve or housing 151 of the terminal 125 to lock the terminal within the body 141.

Banana plugs 161a, FIG. 2A, are screwed onto the threaded end 161, FIG. 4, of the feed-through terminal to provide for electrical connection with output leads from other well survey tools which may be employed in well surveys. While the feed-through terminal has been illustrated as having six feed-through terminals, it will be understood that any number of feed-through terminals may be provided, dependent upon the number of well survey tools to be connected in the string.

Where additional well survey tools are to be connected, it will be desirable to employ a modified form of end plug 120a, FIG. 7. The modified end cap 120a is like the end cap 120 except that the outer terminal portion thereof is provided with threads 162 for connection with suitable cable connecting means available in the art. A passage 163 extends through the end plugs 120a for connection of a survey tool interconnecting cable (not shown) with the contacts of feed-through terminal assembly 140.

Now that the invention has been described and several modifications thereof specifically disclosed, further modifications will become apparent to those skilled in the art, and it is intended to cover those modifications as fall within the scope of the appended claims.

What is claimed is:

1. A well geophone comprising a central mandrel having a central channel extending from one end toward an opposite end thereof; a plurality of transducers; each of said transducers supported on said mandrel and in flow communication with said central channel, means for exposing the transducers to well pressures; said transducers being arranged in pairs with the transducers of each pair being oppositely disposed on said mandrel and being connected electrically in series aiding relation for noise cancellation; and means for rendering said transducers responsive solely to dynamic well pressure changes; said means comprising means forming a reservoir for receiving a pressure-transmitting liquid and responsive to well pressures, and a flow passage including a first flow restriction interconnecting said reservoir and said central channel for transmission to said transducers solely of changes in static well pressures.

2. A supporting structure for a plurality of transducers for use in a high resolution well phone comprising an elongated member having a hollow middle portion forming a central channel and end portions of cross section greater than the cross section of said middle portion of said member to provide with said middle portion a recess for receiving the plurality of transducers, means for mounting the transducers along said middle portion, and passageways extending from the outside surface of said middle portion to said central channel at each transducer mounting position, one of said end portions having a cavity therein which with said central channel and said passageways provides access for electrical interconnection of the transducers, said end portions having means for mounting a shield for encompassing the recess to protect the transducers against physical damage.

3. A supporting structure for a plurality of transducers to be employed in a high resolution well phone comprising an elongated member having a central portion and end portions of cross section larger than said central portion to provide a protective recess for receiving the plurality of transducers, said central portion having a primary passageway extending longitudinally from one end toward an opposite end, a plurality of secondary radial passageways spaced one from another longitudinally along said portion and extending through said central portion and into said primary passageway, each of said secondary passageways being angularly displaced from adjacent longitudinally secondary passageways, means for mounting a transducer at each end of each passageway, and one of said end portions having a cavity communicating with said primary passageway and providing with said primary passageway and said secondary passageways access for the electrical interconnection of the transducers.

4. A well geophone, comprising a central mandrel having a passage extending from one end toward an opposite end thereof, a plurality of transducers, each of said transducers supported on said mandrel and in flow communication with said passage, means for exposing the transducers to well pressures, said transducers being arranged in pairs with the transducers of each pair being oppositely disposed on said mandrel and being connected electrically in series aiding relation for noise cancellation, means forming a reservoir for receiving a pressure-transmitting liquid means responsive to well pressure for varying the pressure in said reservoir, and a flow passage including first and second flow restrictions interconnecting said reservoir and said central channel for transmission to said transducers solely of changes in static well pressures, said second flow restrictions providing additionally for damping of dynamic pressure changes existing in said passage between said first restriction and said transducers.

5. A well geophone having an output signal of high signal-to-noise ratio for use in well surveying with at least one other geophone to be spaced therefrom by an interconnecting cable, said well geophone comprising a central mandrel having a passage extending from one end to an opposite end thereof, a plurality of transducers, each of said transducers supported on said mandrel and in flow communication with said mandrel passage, means for exposing the transducers to well pressures, said transducers being arranged in pairs with the transducers of each pair being oppositely disposed on said mandrel and being connected electrically in series aiding relation for noise cancellation, means forming a reservoir for receiving a pressure-transmitting liquid and responsive to well pressure, a flow passage including a flow restriction interconnecting said reservoir and one end of said mandrel passage for transmission to said transducers solely of changes in static well pressures, means providing a high pressure liquid seal at an opposite end of said mandrel passage, and a plurality of conducting means passing through said seal for electrical connection to a cable interconnecting said well geophone with the other geophone.

6. A well geophone having an output signal of high signal-to-noise ratio comprising a central mandrel having a passage extending from one end toward an opposite end thereof, a plurality of transducers, each of said transducers supported on said mandrel and in flow communication with said mandrel passage, each of said transducers being of the type including magnetic pole pieces and a diaphragm disposed adjacent said pole pieces and responsive to dynamic pressures within the well for movement relative to said pole pieces for generation of electrical signals, a housing cover for each of said transducers comprised of electrically non-conductive material mounted adjacent the exposed surface of said diaphragm, said transducers being arranged in pairs with the transducers of each pair being oppositely disposed on said mandrel and being connected electrically in series aiding relation for noise cancellation, means forming a reservoir for receiving a pressure-transmitting liquid and responsive to well pressures for varying the pressures in said reservoir, said pressure-transmitting liquid being contained by said transducers, and a flow passage including a first flow restriction in the connection between said reservoir and said mandrel passage for transmission to one side of said transducer diaphragm solely of changes in static well pressures, and each of said transducer diaphragms having an aperture for equalization of static pressures on both sides of said diaphragms.

7. A well geophone having an output signal of high signal-to-noise ratio for use in well surveying with at least one other geophone to be spaced therefrom by an interconnecting cable, said well geophone comprising a central mandrel having a passage extending from one end to an opposite end thereof, a plurality of transducers, each of said transducers supported on said mandrel and in flow communication with said mandrel passage, means for exposing the transducers to well pressures, said transducers being arranged in pairs with the transducers of each pair being oppositely disposed on said mandrel and being connected electrically in series aiding relation for noise cancellation, means forming a reservoir for receiving a pressure-transmitting liquid and responsive to well pressure, a flow passage including a first flow restriction interconnecting said reservoir and one end of said mandrel passage for transmission to said transducers solely of changes in static well pressures, a feed-through terminal assembly mounted at an opposite end of said mandrel passage for providing electrical interconnection between said well geophone and the other geophone by way of the interconnecting cable, said assembly providing a fluid-tight seal at said opposite end of said mandrel passage and comprising a metallic body portion having at least one passage formed therethrough, an initial bore, a first counterbore and a second counterbore in said passage, at least one feed-through terminal having a first end portion for receipt by said initial bore and a second portion for receipt by said first counterbore, an O-ring mounted about the second portion of said terminal and receivable in said second counterbore, and means for expanding said O-ring into engagement with the wall structure of said second counterbore to maintain said terminal assembly fluid-tight in the presence of the pressure differential.

References Cited by the Examiner

UNITED STATES PATENTS

| | | | |
|---|---|---|---|
| 768,570 | 8/04 | Mundy | 181—0.51 |
| 1,166,007 | 12/15 | Schmidt | 122—452 |
| 2,448,365 | 8/48 | Gillespie | 340—10 |
| 2,465,696 | 3/49 | Paslay. | |
| 2,651,769 | 9/53 | Stafford | 340—17 |
| 2,664,542 | 12/53 | Lynn | 340—18 X |
| 2,679,832 | 6/54 | Waterman | 122—452 |
| 2,717,369 | 9/55 | Bardeen et al. | 340—17 |
| 2,964,730 | 12/60 | Blanchard | 340—17 X |
| 3,029,407 | 4/62 | Burton et al. | 339—60 |
| 3,040,287 | 6/62 | Agron et al. | 339—94 |

FOREIGN PATENTS 156,271  11/04  Germany.

SAMUEL FEINBERG, *Primary Examiner*.

EVERETT R. REYNOLDS, IRVING L. SRAGOW, CHESTER L. JUSTUS, *Examiners*.